United States Patent [19]

Okamoto et al.

[11] 4,224,302

[45] Sep. 23, 1980

[54] PROCESS FOR PRODUCING AN ALUMINA CATALYST CARRIER

[75] Inventors: Kunio Okamoto, Aichi; Junichiro Naito, Toyokawa; Mitsuru Asano, Okazaki, all of Japan

[73] Assignee: Nippon Soken Inc., Tokyo, Japan

[21] Appl. No.: 17,279

[22] Filed: Mar. 5, 1979

Related U.S. Application Data

[63] Continuation of Ser. No. 721,591, Sep. 8, 1976, abandoned.

[30] Foreign Application Priority Data

Sep. 16, 1975 [JP] Japan ................................. 50-111972
Mar. 3, 1976 [JP] Japan ................................. 51-22847

[51] Int. Cl.³ ............................ C01F 7/02; C01F 7/44
[52] U.S. Cl. ................................. 423/628; 423/212; 423/625; 252/463
[58] Field of Search ............................ 423/625, 628

[56] References Cited

U.S. PATENT DOCUMENTS

| 3,392,125 | 7/1968 | Kelley et al. | 423/628 |
| 3,582,271 | 6/1971 | Minagawa et al. | 423/628 |
| 3,628,914 | 12/1971 | Gaulici | 423/628 |
| 3,850,849 | 11/1974 | Kiovsky et al. | 423/628 |
| 3,853,789 | 12/1974 | Warthen et al. | 423/628 |
| 3,945,945 | 3/1976 | Kiovsky et al. | 423/628 |
| 3,975,510 | 8/1976 | Leach et al. | 423/628 |

*Primary Examiner*—Herbert T. Carter
*Attorney, Agent, or Firm*—Cushman, Darby & Cushman

[57] ABSTRACT

A catalyst carrier high in strength and suitable for use in internal combustion engines is produced by transforming a boehmite into $\gamma$-alumina at a high temperature, transforming the $\gamma$-alumina into $\alpha$-alumina at a high temperature and sintering the $\alpha$-alumina, boehmite having been prepared by forming a large number of agglomerates of adequate size from powdered aluminum hydroxide ($Al_2O_3 \cdot 3H_2O$) and contacting the agglomerates with water vapor at a high temperature and a high pressure to transform the aluminum hydroxide into boehmite.

5 Claims, 2 Drawing Figures

PROCESS FOR PRODUCING AN ALUMINA CATALYST CARRIER

This is a continuation, of application Ser. No. 721,591 filed Sept. 8, 1976 and now abandoned.

BACKGROUND OF THE INVENTION

Field of the Invention

This invention relates to a catalyst carrier which is required to retain sufficient mechanical strengths at high temperatures, and to a process for producing such a carrier, and also to a method for the preparation of boehmite ($Al_2O_3.H_2O$) from which said carrier is produced. More particularly, it relates to a catalyst carrier to be used in internal combustion engines for the purification of exhaust gases, and to a process for producing same.

Among conventional catalyst carriers for use in the purification of automobile exhaust gas, most of the granular types have been produced from $\gamma$-alumina which is generally characterized by having a large specific surface, a small bulk density, and, nevertheless, high mechanical strengths. These conventional $\gamma$-alumina catalyst carriers, however, transform into $\alpha$-alumina on being exposed to high temperatures when in use and markedly lose in specific surface and in mechanical strengths, accompanied by increased abrasion and deterioration of the activity of catalyst. Moreover, in order to conform to the regulation for control of the NOx emission, recent tendency is to use in place of the former single bed oxidation catalyst a two-bed oxidation-reduction catalyst system which is placed nearer the engine in the exhaust pipe and, in some cases, even in the exhaust manifold, thus increasing the possibility of the above-noted troubles owing to exposure of the catalyst carrier to higher temperatures. Such troubles, originated from the changes in physical properties which take place along with the transformation of $\gamma$-alumina to $\alpha$-alumina, might be avoided, if a carrier having approximately the same properties as those of $\gamma$-alumina could be produced from $\alpha$-alumina having the most stable crystalline structure among the modifications of alumina. Known methods for producing an $\alpha$-alumina carrier and the properties of the carrier obtained are as shown below.

(A) Aluminum hydroxide ($Al_2O_3.3H_2O$), used as starting material, is calcined at 500° to 700° C. to form an activated alumina ($\gamma$-alumina, etc.), and the powdered activated alumina is granulated after addition of a binder or the like, and then sintered by heating at a higher temperature of 1,400° to 1,600° C. to obtain an $\alpha$-alumina carrier having high mechanical strengths.

(B) The same starting material as in (A) is calcined at a high temperarture of 1,200° to 1,300° C. to form an $\alpha$-alumina powder, the resulting powder is granulated after addition of a binder or the like, and the granules are sintered by heating at a higher temperature of 1,400° to 1,600° C. to obtain an $\alpha$-alumina carrier of high mechanical strengths.

Upon examination under an electron microscope, the present inventors found that both of the catalyst carriers prepared by the above methods (A) and (B) are composed of $\alpha$-alumina particles in regular form of hexagon or sphere of the even size and, moreover, the particles are arranged closely packed together. This particle form seems to be the main cause of the aforesaid troubles. The reason may be explained in the following manner by taking the case (B) as example. Under an electron microscope, the particles of aluminum hydroxide used as starting material showed a regular hexagonal form of the even size, and the particles after having been calcined at 1,300° C. were also of regular forms of a shrinked hexagon and an approximate sphere, each of the even size. After granulation and subsequent sintering, the particles may be bonded together through plane contact or spheric contact because of the above-noted shape of the particles. Consequently, in order to develop sufficient strength, the particles must be firmly bonded together by sintering at quite a high temperature or by use of a powerful binder, resulting in decreased specific surface, increased bulk density, and decreased pore volume. The decreased specific surface of the carrier causes difficulty in supporting the catalyst (for example, platinum or palladium), while the increased bulk density or decreased pore volume results in increased heat capacity and makes it difficult to obtain a satisfactory initial activity of the catalyst for exhaust gas purification. Therefore, the properties of $\alpha$-alumina catalyst carriers prepared by the known methods are quite different from those of $\gamma$-alumina required for a catalyst carrier to be used in automobile exhaust gas purification. Actually, no $\alpha$-alumina catalyst is used at present in automobile exhaust gas purification.

On the other hand, boehmite ($Al_2O_3.H_2O$), which constitutes the base material for the catalyst carrier, has heretofore been prepared by hydrothermal treatment (a treatment by contacting with water vapor at high temperatures and high pressures) of powdered aluminum hydroxide having the chemical formula $Al_2O_3.3H_2O$ which is used as raw material without any pretreatment.

However, in carrying out the conventional method for preparing boehmite by hydrothermal treatment of powdered aluminum hydroxide used as raw material without any pretreatment, difficulty is encountered in penetration of the water vapor into pores between particles owing to inevitable compact loading of aluminum hydroxide powder in the autoclave. Consequently, when a large quantity of aluminum hydroxide powder is to be converted into boehmite, with the depth of the charged layer of aluminum hydroxide powder, penetration of water vapor becomes more difficult and, hence, the conversion to boehmite is more retarded owing to insufficinet contact with the water vapor. For the above reason, the conventional method for preparing boehmite from aluminum hydroxide powder without any pretreatment has disadvantages with respect to quantity, time, and efficiency.

SUMMARY OF THE INVENTION

An object of this invention is to provide a novel and useful method for preparing boehmite, whereby the aforementioned disadvantages may be overcome, which comprises the steps of preparing a great number of agglomerates having an adequate size from aluminum hydroxide represented by the chemical formula $Al_2O_3.3H_2O$ and contacting the great number of agglomerates with water vapor at a high temperature and a high pressure, thereby to effect transformation into boehmite represented by the chemical formula $Al_2O_3.H_2O$.

When, according to this invention, a great number of agglomerates having an adequate size are prepared from powdered aluminum hydroxide ($Al_2O_3.3H_2O$) and the great number of agglomerates are hydrothermally treated, the water vapor freely penetrates into sufficiently large pores between the agglomerates. Since the agglomerate is of adequate size and not too large, the water vapor easily permeates throughout the agglomerate, thus enabling all of the aluminum hydroxide particles to contact smoothly with the water vapor in a short period of time. It is needless to say that a large quantity of boehmite may be produced very efficiently in a shorter period of time, as compared with conventional methods. The boehmite obtained in the form of chip is used after crushing as the base material for the catalyst carrier. Said hydrothermal treatment may be carried out at a temperature of about 170° C. or higher and under a pressure of about 6 kg/cm$^2$ or higher.

Another object of this invention is to provide a catalyst carrier of network structure formed by first preparing α-alumina particles in elongated shape such as needle or fiber and then intertwining the elongated α-alumina particles.

As compared with a conventional catalyst carrier of α-alumina, in which α-alumina particles are arranged compactly and in good order (hereinafter a catalyst carrier of such a type is referred to as conventional catalyst carrier), the above catalyst carrier according to this invention is higher in strength because of intertwinement of the α-alumina particles, is higher in porosity and lower in bulk density because of a larger volume of pores resulting from the network structure, and is higher in specific surface because of elongated form of the α-alumina particles.

The form of the catalyst carrier of this invention may be pellet-like, honeycomb-like, or any other without particular restriction, as shown in Examples given later. Moreoever, the catalyst carriers of this invention includes not only those composed of only α-alumina prepared according to this invention, but also those composed of α-alumina prepared according to this invention and coated on a substrate such as porcelain (for example, cordierite porcelain).

A further object of this invention is to provide a process for producing a catalyst carrier comprising α-alumina of network structure formed by intertwinement of α-alumina particles in elongated form by utilizing the aforesaid method for preparing boemite.

DETAILED DESCRIPTION OF THE PREFERRED EMBODIMENTS

Figure 1:
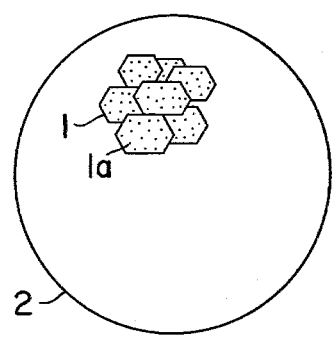
FIG. 1 is a schematic view illustrating the structure of gibbsite used as the starting material of this invention.

The invention is described below in detail. At first the method for preparing boehmite for use as the base material for the present catalyst carrier is illustrated below with reference to Examples.

EXAMPLE I

950 Cubic centimeters of water was added to 2 kg of aluminum hydroxide (Al$_2$O$_3$.3H$_2$O) and thoroughly mixed in a mixer. The mixture was extruded by means of an extruder to prepare cylindrical chips (agglomerates), 5 mm in diameter and 5 mm in length, which are called the first material. The first material was treated hydrothermally in an autoclave at 240° C. and a pressure of 35 kg/cm$^2$ (high temperature and high pressure). It was found that all of the powdered aluminum hydroxide had been transformed into boehmite in one hour.

EXAMPLE II

950 Cubic centimeters of water was added to 2 kg of powdered aluminum hydroxide (Al$_2$O$_3$.3H$_2$O) and mixed thoroughly in a mixer. The resulting mixture was extruded by means of an extruder to prepare cylindrical chips, 10 mm in diameter and 10 mm in length. The chips were subjected to hydrothermal treatment in an autoclave at 240° C. and a pressure of 35 kg/cm$^2$. It was found that all of the powdered aluminum hydroxide had been transformed into boehmite in one hour.

EXAMPLE III

950 Cubic centimeters of water was added to 2 kg of powdered aluminum hydroxide and mixed thoroughly in a mixer. The resulting mixture was extruded by means of an extruder to prepare cylindrical chips, 20 mm in diameter and 20 mm in length. The chips were subjected to hydrothermal treatment at 240° C. and a pressure of 35 kg/cm$^2$. It was found that all of the aluminum hydroxide had been transformed into boehmite in one hour.

EXAMPLE IV

950 Cubic centimeters of water was added to 2 kg of powdered aluminum hydroxide (Al$_2$O$_3$.3H$_2$O) and mixed thoroughly in a mixer. The resulting mixture was extruded by means of an extruder to prepare cylindrical chips, 30 mm in diameter and 30 mm in length. The chips were subjected to hydrothermal treatment at 240° C. and a pressure of 35 kg/cm$^2$ in an autoclave. It was found that all of the powdered aluminum hydroxide had been transformed into boehmite in 1 hour and 10 minutes.

EXAMPLE V

950 Cubic centimeters of water was added to 2 kg of powdered aluminum hydroxide (Al$_2$O$_3$.3H$_2$O) and mixed thoroughly in a mixer. The resulting mixture was extruded by means of an extruder to prepare cylindrical chips, 50 mm in diameter and 50 mm in length. The chips were subjected to hydrothermal treatment in an autoclave at 240° C. and a pressure of 35 kg/cm$^2$. It was found that all of the aluminum hydroxide had been transformed into boehmite in 1 hour and 20 minutes.

The results obtained by the conventional method are shown in the following Reference Example for the purpose of illustrating the superiority of the present method for preparing boehmite.

REFERENCE EXAMPLE

Two kilograms of powdered aluminum hydroxide was charged into a stainless stell (SUS 27) vessel, 18 cm in inside diameter, which had been placed in an autoclave, and subjected to hydrothermal treatment at a high temperature and a high pressure (240° C., 35 kg/cm$^2$). The conversion to boehmite was about 30% after one hour of the treatment, about 35% after one hour and ten minutes, and about 40% after one hour and twenty minutes. A long period of 4 hours was required to convert all of the powdered aluminum hydroxide into boehmite.

As described above, according to the present method for preparing boehmite, a large quantity of boehmite may be efficiently prepared in a short period of time. Contrary to the conventional method, there is no fear of dust pollution in the step of conversion to boehmite, because powdered aluminum hydroxide is not used as such but is used after having been agglomerated.

The present process for producing a catalyst carrier based on the boehmite obtained as mentioned above is described below.

On X-ray analysis, the boehmite obtained above showed, as expected, a crystalline structure characteristic of the perfect boehmite. Examination under an electron microscope revealed that the boehmite particles were in elongated and complicated form and that these elongated particles intertwined with one another, forming a network structure. Since such a structure was desirable for the object of this invention, the properties of α-alumina formed from this boehmite were tested. That is, said particles were calcined at 600° C. to transform them into γ-alumina and then the resultant γ-alumina was transformed into α-alumina by calcination at 1,100° C. Thus obtained α-alumina was satisfactory in all requisite properties but for the strength (7 kg) because of insufficient interparticle bonding. On calcining at a little higher temperature (1,200° C.), a prescribed strength (15 kg or higher) was attained without significant loss in other properties.

Said transformation of boehmite into γ-alumina may be carried out at a temperature of about 540° C. to 800° C. for about more than one hour. The transformation of the γ-alumina into α-alumina may be carried out at a temperature of about 1,150° C. to 1,300° C. for a time which may vary with temperature, etc. and the optimum conditions are 1,200° C. and 2 hours.

The catalyst carrier and the process for producing the same according to this invention are illustrated below in detail with reference to Examples, but the invention is not limited to Examples.

EXAMPLE VI

One kilogram of gibbsite ($Al_2O_3.3H_2O$), which had been ground in a ball mill to a particle size of about $3\mu$, was added to 1 kg of gibbsite of a particle size of about $40\mu$ and mixed thoroughly (this mixture is referred to as first material). 308 Grams of a 1% (by weight) aqueous solution of methylcellulose was added in small portions with stirring to the first material and then thoroughly mixed. The resulting mixture was extruded by means of an extruder to prepare chips. The chips were formed into granules, 3 to 4 mm in diameter, by the rolling granulation technique (the resulting granules are referred to as second material). The second material was dried in a drier in two stages, first at 60° C. for 2 hours and then at 120° C. for 6 hours. The dried material was placed in an autoclave and subjected to hydrothermal treatment at 240° C. and a pressure of 35 kg/cm² for 4 hours to transform the gibbsite to boehmite. The resulting material was calcined at 600° C. for 2 hours to remove methylcellulose by burning and to transform the boehmite into γ-alumina (this γ-alumina material is referred to as third material). The third material was calcined in an electric furnace at 1200° C. for 2 hours to transform the γ-alumina into α-alumina and to sinter the resulting α-alumina.

Figure 2:
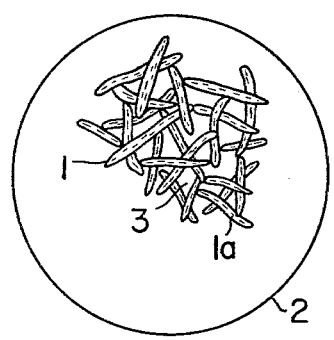
FIG. 2 is a schematic view illustrating the structure of the present catalyst carrier.

Electron microscopic examination revealed the following facts:

In the granular catalyst carrier comprising gibbsite before hydrothermal treatment in the autoclave, a great number of α-alumina particles 1 in nearly regular shape were arranged compactly and orderly, as shown in FIG. 1, wherein 1a represents a fine particle constituting the α-alumina particle and 2 represents the carrier. In the catalyst carrier, obtained as described above, comprising granular α-alumina, a great number of α-alumina particles 1 in elongated shape intertwined with one another, forming a network structure, as shown in FIG. 2, wherein 3 represents a void.

EXAMPLE VII

One kilogram of gibbsite ($Al_2O_3.3H_2O$), which had been ground in a ball mill to a particle size of about $3\mu$, was added to 1 kg of gibbsite of a particle size of about $40\mu$ and mixed thoroughly to obtain the first material. 270 Grams of water was added in small portions with stirring to the first material and then thoroughly mixed. In the same manner as described in Example VI, the mixture obtained above was granulated and the boehmite was transformed into α-alumina which was sintered.

EXAMPLE VIII

308 Grams of a 1% aqueous solution of methylcellulose was added to 2 kg of gibbsite, which has been ground in a ball mill to a particle size of $3\mu$, and then thoroughly mixed. In the same manner as described in Example VI, the mixture obtained above was granulated and the boehmite was transformed into α-alumina which was sintered.

EXAMPLE IX

270 Grams of water was added to 2 kg of gibbsite, which had been ground in a ball mill to a particle size of $3\mu$, and thoroughly mixed. In the same manner as described in Example VI, the material obtained above was granulated and the boehmite was transformed into α-alumina which was sintered.

For the purpose of illustrating the superiority of the present catalyst carrier, a conventional γ-alumina carrier, a conventional carrier (A), and a conventional carrier (B) were prepared as described in the following

COMPARATIVE EXAMPLES.

COMPARATIVE EXAMPLE I

800 Grams of cellulose was added to 2 kg of γ-alumina, obtained from gibbsite as starting material by calcination at 500° to 700° C., and thoroughly mixed to obtain a first material. 1,000 Cubic centimeters of water was added to 600 g of an alumina sol and mixed thoroughly to obtain a first solution. The first solution was added in small portions with stirring to the first material and then mixed thoroughly. The resulting material was extruded by means of an extruder to prepare chips. The chips were formed into granules, 3 to 4 mm in diameter, by the rolling granulation technique. The resulting granules were dried in a drier in two stages, first at 60° C. for 12 hours, then at 120° C. for 6 hours. The dried granules were calcined in an electric oven at 500° C. for 2 hours, then at 600° C. for 2 hours to obtain a conventional γ-alumina-based catalyst carrier.

COMPARATIVE EXAMPLE II

800 Grams of cellulose was added to 2 kg of γ-alumina, obtained from gibbsite as starting material by calcination at 500° to 700° C., and thoroughly mixed to obtain a first material. 570 Cubic centimeters of water was added to 750 g of an alumina sol and mixed thoroughly to obtain a first solution. The first solution was added in small portions with stirring to the first material and then mixed thoroughly. The resulting material was extruded by means of an extruder to prepare chips. The chips were formed into granules, 3 to 4 mm in diameter, by the rolling granulation technique. The resulting granules were dried in a drier in two stages, first at 60° C. for 12 hours, then at 120° C. for 6 hours. The dried granules were sintered in an electric furnace at a high temperature of 1,400° C. to 1,600° C. for 2 hours to obtain a conventional catalyst carrier (A).

COMPARATIVE EXAMPLE III

An α-alumina powder was obtained by calcining gibbsite at a high temperature of 1,200° to 1,300° C. 800 Grams of cellulose was added to 2 kg of the above α-alumina and mixed thoroughly to obtain a first material. 570 Cubic centimeters of water was added to 750 g of an alumina sol and mixed to obtain a first solution. From there on, the procedure of Comparative Example II was followed to obtain a conventional catalyst carrier (B).

The advantages of this invention are described below by comparing physical characteristics of the catalyst carriers obtained in Examples VI to IX with those of the catalyst carriers obtained in Comparative Examples I to III. In Table 1 are shown test results on bulk density, specific surface, crushing strength, and pore volume of the catalyst carriers obtained in Examples VI to IX and Comparative Examples I to III.

The crushing strength was evaluated by compressing the test specimen with a piston-type metallic element of a Kiya-type hardness tester and measuring the compressive load (kg) at failure (mean value of 50 observations). The specific surface was calculated by well-known BET method. The bulk density was determined by weighing 100 cc of the catalyst carrier measured with a measuring cylinder. The pore volume was measured by means of a well-known porosimeter.

Table 1

| Example No. | Bulk density (g/cc) | Specific surface (m²/g) | Crushing strength (kg) | Pore volume (cc/g) |
|---|---|---|---|---|
| VI | 0.73 | 28.1 | 20.7 | 0.46 |
| VII | 0.71 | 30.4 | 19.0 | 0.48 |
| VIII | 0.74 | 29.3 | 20.4 | 0.45 |
| IX | 0.72 | 31.0 | 19.2 | 0.46 |
| Comparative Example I (conventional γ-alumina carrier) | 0.4–0.8 | 40–150 | 3–10 | 0.4–1.0 |
| Comparative Example II (conventional carrier A) | 1.27 | 1.8 | 14.3 | 0.15 |
| Comparative Example III (conventional carrier B) | 1.43 | 1.1 | 18.8 | 0.10 |

As is understandable from Table 1, as compared with a conventional catalyst carrier comprising γ-alumina, the present catalyst carrier comprising α-alumina is somewhat inferior in specific surface, but is comparable or superior in other physical properties. In other words, in overall property the present catalyst carrier is substantially comparable to the conventional γ-alumina-based catalyst carrier. It is seen that the present catalyst carrier is far superior to the conventional catalyst carriers (A) and (B). The superiority of the present catalyst carrier originates, of course, from its characteristic structure.

What is claimed is:

1. A method for preparing boehmite from powdered aluminum hydroxide ($Al_2O_3.3H_2O$) comprising the steps of:

providing a first aluminum hydroxide having a particle diameter of about 40μ;

mixing said first aluminum hydroxide with an equal amount of a second aluminum hydroxide having a particle diameter of about 3μ;

admixing the resulting mixture with an aqueous solution of methylcellulose;

forming the resulting mixture of the first and second aluminum hydroxide and the aqueous solution of methylcellulose into agglomerates having a diameter of 3 to 4 mm; and contacting the agglomerates with water vapor at a temperature of at least about 170° C. and a pressure of at least about 6 kg/cm² to transform the aluminum hydroxide into boehmite ($Al_2O_3.H_2O$).

2. A process for producing a catalyst carrier from powdered aluminum hydroxide comprising the steps of:

providing a first powdered aluminum hydroxide having a particle diameter of about 40μ;

mixing said first powdered aluminum hydroxide with an equal amount of a second powdered aluminum hydroxide having a particle diameter of about 3μ;

admixing the resulting mixture with an aqueous solution of methylcellulose;

forming the resulting mixture of the first and second powdered aluminum hydroxide and the aqueous solution of methylcellulose into agglomerates having a diameter of 3 to 4 mm;

contacting said agglomerates with water vapor at a temperature of at least about 170° C. and a pressure of at least about 6 kg/cm² to transform the aluminum hydroxide into boehmite; and transforming said boehmite into γ-alumina and then transforming the γ-alumina into α-alumina at a temperature of at least about 1150° C. and sintering said α-alumina.

3. A process for producing a catalyst carrier according to claim 2, wherein the step of transforming the boehmite into the γ-alumina is carried out at a high temperature of 600° C. for 2 hours.

4. A process for producing a catalyst carrier according to claim 2, wherein the step of transforming the γ-alumina into the α-alumina is carried out at a high temperature of 1,200° C. for 2 hours.

5. A process according to claim 2 wherein the boehmite is transformed into γ-alumina at 600° C. and the γ-alumina is transferred into α-lumina at 1200° C.

* * * * *